United States Patent [19]

Ferraro et al.

[11] 4,075,369
[45] Feb. 21, 1978

[54] METHOD OF COATING WITH WATER DISPERSIBLE, LOW MOLECULAR WEIGHT POLYAMIDE RESIN PARTICLES OF UNIFORM SIZES

[75] Inventors: Charles F. Ferraro, Trenton; Richard A. Javick, Princeton Junction, both of N.J.; James A. Robertson, Levittown, Pa.

[73] Assignee: FMC Corporation, Philadelphia, Pa.

[21] Appl. No.: 681,826

[22] Filed: Apr. 30, 1976

Related U.S. Application Data

[62] Division of Ser. No. 492,609, July 29, 1974, abandoned, which is a division of Ser. No. 248,063, April 27, 1972, Pat. No. 3,844,991.

[51] Int. Cl.$^2$ .................... B05D 1/24; B05D 3/02
[52] U.S. Cl. ........................ 427/185; 427/195; 427/375; 427/385 A; 427/388 C
[58] Field of Search ........... 427/375, 185, 195, 385 A, 427/388 C; 260/29.2 N, 18 N

[56] References Cited

U.S. PATENT DOCUMENTS

| | | | |
|---|---|---|---|
| 2,241,322 | 5/1941 | Hanford | 260/2 |
| 2,279,774 | 4/1942 | Bolton | 427/375 |
| 2,348,751 | 5/1944 | Peterson | 260/29.2 N X |
| 2,742,440 | 4/1956 | Scott et al. | 260/29.2 N X |
| 2,972,553 | 2/1961 | Hess | 427/421 X |
| 3,446,782 | 5/1969 | Okazaki et al. | 260/78 |
| 3,476,711 | 11/1969 | Muller et al. | 260/78 L |
| 3,481,906 | 12/1969 | Maruyama et al. | 260/78 L |
| 3,496,002 | 2/1970 | Wolfes et al. | 427/195 |
| 3,536,647 | 10/1970 | Battista | 260/29.2 N |
| 3,564,599 | 2/1971 | Schaff et al. | 260/78 L |

FOREIGN PATENT DOCUMENTS

1,180,023  2/1970  United Kingdom.

*Primary Examiner*—Harry J. Gwinnell
*Assistant Examiner*—Shrive P. Beck
*Attorney, Agent, or Firm*—George F. Mueller; Robert D. Jackson

[57] ABSTRACT

Finely-divided, water dispersible, low molecular weight, linear polyamide resin particles having a unique morphology and of uniform particle sizes are formed by preparing a linear polyamide of a predetermined low molecular weight in the presence of water followed by rapidly quenching the reaction mass with an aqueous medium below the freezing point of the polyamide and continuing the cooling of the mass to a temperature sufficiently low so as to prevent particle growth and structural alteration while regulating the pH of the quenched mass to provide particles of predetermined, uniform size dispersed in the aqueous medium. The particles vary from ultimate flaky sheets or lamellae to loosely packed, randomly oriented, clusters of flaky sheets. Spray dried products may be agglomerates which disintegrate readily in water to the original particles or aggregates depending upon intended uses. The dispersions and dried products are useful in the coating art and the polyamide may be polymerized to high molecular weights after application to a substrate.

8 Claims, No Drawings

METHOD OF COATING WITH WATER DISPERSIBLE, LOW MOLECULAR WEIGHT POLYAMIDE RESIN PARTICLES OF UNIFORM SIZES

This application is a division of application Ser. No. 492,609, filed July 29, 1974 (abandoned in view of continuation application Ser. No. 681,852, filed Apr. 30, 1976), which is a division of application Ser. No. 248,063, filed Apr. 27, 1972, now U.S. Pat. No. 3,844,991, dated Oct. 29, 1974.

This invention relates to low molecular weight, linear polyamide resins in the form of finely-divided, water dispersible particles of sizes falling within controlled, very narrow size ranges, aqueous dispersions thereof and a method of preparing same.

Finely divided polyamide resins have been proposed for use in the coating art. In powder form, they have been used by immersing a heated article in a bed, such as a fluidized bed, of the powder, or by a flame spraying procedure. In British Pat. No. 1,180,023 it is proposed to immerse the heated metal article into a fluidized bed of finely divided, low molecular weight polyamide particles containing an oxy-acid of phosphorus and subsequently subjecting the article to a further heat treatment so as to further polymerize the polyamide and thereby form a coating of a high molecular weight polyamide. Such method may be satisfactory for coating of rods and simple shapes but is not adaptable to the coating of complicated shapes or large articles, or articles or objects of low heat capacity such as, for example, wire screening, metal foil, etc. Alternatively, it has been proposed to use solutions of superpolyamides, however, the polyamides are generally soluble only in toxic and/or corrosive liquids such as phenol, cresol, formic acid, hydrochloric acid, or a limited number of organic liquids such as furfuryl alcohol or formamide. These solutions require special handling techniques and are highly disadvantageous in that normally the solvent presents pollution problems and must be recovered.

As a further alternative, as, for example, in wire coating the superpolyamide resin may be in a molten state and the wire drawn through the molten resin. Both the solution and the molten techniques are undesirable because, in general, the synthetic, linear superpolyamides are degraded rather rapidly at the solution and at the molten temperatures which are required. Further disadvantages are associated with these methods of application utilizing the present commercially available high molecular weight polyamides. In the application of a coating from a solution of the polyamide, the coating is limited to a few tenths of a mil and, in general, several coatings are required with the necessity of drying and fusing each coat before the application of an additional coat. On the other hand, coatings applied by a molten technique are at least 10 mils in thickness because of the high viscosity of the molten polyamides.

Various methods have been proposed to form polyamide dispersions adapted for use in the coating art. The most common proposal is to dissolve the superpolyamide in a suitable solvent and then pouring the solution into a larger volume of a non-solvent with vigorous agitation. It has also been proposed to vigorously agitate water and a dispersing agent at temperatures sufficiently high to melt a thermoplastic resin such as a polyamide and thereby form a dispersion of the resin. In these various prior art procedures the polyamides are the so-called superpolyamides which are fiber-forming and film-forming high molecular weight polyamide resins.

In U.S. Pat. Nos. 3,299,011 and 3,536,647, a fiber-and film-forming superpolyamide is partially degraded so as to remove amorphous portions of the polyamide and the resulting partially degraded polyamide is subjected to mechanical attrition in the presence of a liquid swelling medium. The resulting product, which has been termed a microcrystalline, synthetic, linear polyamide, is dispersible in water and other liquid swelling media. As a result of the required mechanical attrition, the size of the particles extend over a very wide range. Thus a severely attrited product containing about 90% by weight of particles not exceeding 1 micron contains particles as small as 0.01 micron and as large as about 15 microns. A moderately attrited material will contain particles as large as 100 microns and particles under 0.2 micron and some as small as 0.01 micron. Because of the presence of the minute particles, particularly those under 0.1 micron, upon drying, particles become bonded together into larger size particles or agglomerates to such a degree that it is almost impossible to reduce the particles to their original size and thus redisperse the material.

One of the characteristics of these prior dispersible polyamide particles is their colloform or globular, granular form or shape. Because of this form or shape of particle which becomes deposited on the substrate being coated it is necessary to subject the substrate bearing the deposited particles to an elevated temperature for a sufficient period of time so as to permit the complete melting and flowing of the molten particles to form a continuous coating.

One of the purposes of the present invention is to provide low molecular weight, linear polyamides in the form of finely-divided, water dispersible particles of sizes falling within controlled, very narrow size ranges by a simple and inexpensive method.

A further purpose of the present invention is to provide a simple and inexpensive method for the preparation of aqueous dispersions of these finely divided, low molecular weight, linear polyamide resins.

A further purpose of the present invention is to provide finely divided, low molecular weight, linear polyamide resin particles of a unique shape or form as will be described hereinafter.

Another purpose of this invention is to provide a simple and inexpensive method for the production of finely divided, low molecular weight, linear polyamide resin particles of the unique shape or form which are extremely uniform in particle size.

Another purpose of this invention is to provide finely divided, low molecular weight, linear polyamide resin particles which are readily dispersible in water.

A further purpose of this invention is to provide aqueous dispersions of finely-divided, low molecular weight, linear polyamide resin particles within very narrow size ranges which may be applied directly to a substrate by any desired conventional method without the necessity of utilizing an intermediate or primer coating.

Another object of the invention is to provide finely-divided, low molecular weight polyamide resin particles which may be utilized in conventional powder coating of substrates so as to provide adherent coatings without the necessity of utilizing an intermediate or primer coating.

Other objects and advantages of the invention will become apparent from the following description and the claims.

The present invention contemplates the preparation of low molecular weight, linear polyamide resin particles wherein water and a monomer or a mixture of monomers, or, alternatively, water and a high molecular weight, linear superpolyamide resin is heated in a closed or sealed system to a temperature above the melting point of the specific polyamide which is being formed followed by quenching rapidly in an aqueous medium to a temperature below the freezing point of the formed polyamide so as to obtain the unique particles of sizes and structure as will be described hereinafter and continuing to reduce the temperature of the mass to a point where particle growth is prevented and the initial particle size and structure is retained while vigorously agitating or stirring the entire mass and controlling or regulating the pH of the entire mass. The resulting product consists of a stable aqueous dispersion of the low molecular weight polyamide particles. The consistency will vary depending upon the solids content generally varying from a milk-like dispersion at low solids content to a paste-like product at high solids content. When practicing the method in a batch-wise manner, as illustrated in the examples, the rapid quenching and cooling may be effected conveniently under normal atmospheric conditions of pressure by discharging the heated mass into an open tank containing a sufficient quantity of a cold aqueous medium so that the temperature of the entire quench mass is brought to a temperature below the boiling point of water, as, for example, a temperature not exceeding about 90° C to 95° C.

One of the unique characteristics of the products is the uniformity of size of the low molecular weight polyamide particles achieved by a control of the pH value of the quenched mass; that is, the particles are within a very narrow range of particle sizes of not more than several microns. For example, in those instances where the polyamide resin is a low molecular weight polycaprolactam and the pH of the final quenched mass is above about 7 and up to about 9, or where an alkaline material has been added, if necessary, to provide a desired predetermined pH value within this range, the mean size of the particles will be within the range of between about 2 microns and about 6 microns. Where the pH of the final mass is about 3.5 to about 7, the particles will be of a mean size of about 0.5 micron to 2 microns. As an alternative, a soap such as sodium, potassium or ammonium oleate, stearate, etc., may be included in the initial charge and in such instance where the quenched mass has a pH of about 8.5, the particles will have a size between about 0.1 micron and 0.5 micron. In those instances where a soap is present and the pH of the quenched mass is about 3, all of the particles are appreciably below 0.1 micron in maximum size and of approximately the same size, approximately 0.03 × 0.03 × 0.005 micron, a ratio of thickness to maximum dimension of approximately 1 to 6.

The monomers satisfactory for the purpose of the present invention include, for example, ω-aminocarboxylic acids, such as 6-aminocaproic acid, or their corresponding lactams or cyclic amides, such as, ε-caprolactam, and salts of diamines with dicarboxylic acids, such as, hexamethylene diamine with hexanedioic (adipic) acid, and mixtures of ω-aminocarboxylic acids, such as, 6-aminocaproic acid and 11-aminoundecanoic acid, or ε-caprolactam and 12-aminododecanoic acid, and mixtures of ω-aminocarboxylic acid or lactam and a salt of a diamine with a dicarboxylic acid, such as, a mixture of ε-caprolactam and hexamethylenediammonium adipate (nylon-6,6 salt).

High molecular weight, linear polyamide resins satisfactory for the purposes of the invention include such high molecular weight resins as derived from the foregoing monomers and mixtures.

In U.S. Pat. No. 2,241,322 a cyclic amide such as ε-caprolactam and water (the water content in the mixture varies from 1.6% to 61.5%) are heated under high pressure to a temperature between 180° to 300° C. to effect a partial polymerization of the lactam. The pressure is then reduced to atmospheric pressure and the water and unchanged monomer gradually distilled from the mass and polymerization allowed to proceed to form a superpolyamide or fiber-forming resin. Where the initial polymerization step is arrested and the mass is allowed to cool, the product will vary from a wax-like solid where the water content in the mixture is about 1.6% to a cheese-like mass where the water is at an upper limit of about 61.5%. The polymer which is formed crystallizes in a dendritic-like structure and forms large aggregates of the dendritic structures. These aggregates as formed are too coarse to permit direct dispersion to form stable and useful dispersions. The cheese-like masses that are formed from charges wherein the percentage of water is in the upper portion of the above stated range even when subjected to at least 3 passes through a roll mill contain particles over a large size range up to particles as large as 1 mm.

In accordance with the present invention, a mixture of the polymer forming monomer or monomers, or a high molecular weight polyamide and water is introduced into a pressure vessel or an autoclave that is provided with means for agitating the mass during the heating period. The mixture or charge contains from about 30% to about 80%, preferably between 50% and 65%, by weight of the monomer or polyamide with the balance water. If desired, the charge may also include an acidic or alkaline substance to serve to regulate the pH of the final quenched mass. The pressure vessel is also provided with a dip tube extending to a position just above the bottom of the vessel to serve as a means for discharging the mass at the termination of the heating period. The dip tube is provided with a valve externally of the vessel and the external end of the dip tube extends into a quench tank. After sealing the pressure vessel, the mass is heated to about 230° C. to 235° C. or other applicable elevated temperature and maintained at such temperature for from 4 to 24 hours, 6 to 10 hours being generally sufficient. Under these conditions the pressure will rise to about 400 to 500 psi.

The higher the proportion of monomer or high polymer in the charge, the higher the number average molecular weight of the polymer which is being formed and the lower the proportion of monomer and oligomers; that is, polymer having a D. P. (degree of polymerization) not exceeding about 4. Roughly, using ε-caprolactam as the monomer, the number average molecular weight of the polymer formed and under the above stated conditions will vary between about 1300 and about 7,300, corresponding to a D. P. of between about 12 and about 65. The reduced viscosity as measured at 20° C. of a m-cresol solution containing 1 gm. of polymer per deciliter of solution will vary from about 0.1 to about 0.4.

In order to form the unique dispersible particles of the present invention, it is essential and critical that following the heating step the entire mass be quenched in an aqueous medium as rapidly as possible to reduce the temperature of the mass below the freezing point of the formed polyamide, to continue the cooling of the mass so as to prevent the growth of the particles and prevent an alteration of the structure of the particles and to bring the entire mass to a uniform predetermined pH value. In batch-wise procedure, quenching and cooling may be effected in a suitable tank open to the atmosphere and provided with agitating means, such as a Lightnin Mixer having a baffle plate, wherein the quench bath and discharging mass is subjected to good agitation so as to reduce the temperature of the discharging mass below about 90° C. to 95° C. as rapidly as feasible and to bring the entire mass to the predetermined pH.

In batch-wise procedure, the valve on the dip tube is opened at the termination of the heating period thereby allowing the autogenous pressure in the autoclave to force the reaction mass through the tube into the quench bath. The quench bath conveniently may consist of water and crushed ice. Obviously, the quench bath may consist of water cooled by means of suitable cooling coils. The weight ratio of the quench bath to the reaction mass may vary from about 2:1 to about 6:1, generally being about 4:1. In those instances where the initial charge does not include a substance to provide the predetermined desired pH of the final quenched mass, the pH controlling substance is incorporated in the quench bath. As the reaction mass issues from the dip tube into the agitated quench bath, the reaction mass is instantaneously brought to a temperature below the freezing point of the polymer, is cooled to a temperature sufficiently low so as to prevent particle growth and structural alteration of the particles and brought to the predetermined pH thereby forming uniformly sized particles of loosely packed, randomly oriented, bonded lamellar sheets. In a typical example using ε-caprolactam and water as the reaction mass, such as will be described in detail in Examples 1 to 9 set forth hereinafter, the total time to discharge 6 gallons of reaction mass and cool it to a temperature below 90° C. was approximately 90 seconds, although, as stated, each increment of the discharging mass as it leaves the dip tube becomes cooled instantaneously.

Utilizing the foregoing conditions and the conditions as set forth in the examples which are included hereinafter; that is, the composition of the initial charge and the reaction conditions of time, temperature, and pressure, the reaction mass attains approximate equilibrium composition. Obviously, the method will be practiced in a manner and under conditions so as to produce a product having a predetermined desired molecular weight. Hence, as will be recognized, a higher proportion of monomer may be included in the initial charge so that the desired molecular weight may be attained in a shorter time period by arresting the reaction or polymerization prior to reaching an equilibrium composition. In such practice, the quenched mass will contain higher proportions of monomer and oligomers than under equilibrium conditions and, advantageously, the quenched mass may be processed as by centrifugation or electrodeposition so as to separate the solids as a wet cake and recover a liquid phase containing some of the monomer and dissolved oligomers which may be used in the preparation of subsequent charges.

The resulting product is a dispersion and the consistency will vary depending upon the solids content and the particle size of the polymer particles will be dependent upon the pH of the original quenched mass. Where the particles of this invention do not exceed about 2 microns and the solids content is in the useful range, the particles will remain in suspension or in a dispersed state for an indefinite period of time. Where the particles exceed about 2 microns and the pH of the dispersion is above about 6.5 some settling of the particles may take place with time. However, the particles do not pack into a dense mass even over extended periods and they may be redispersed by merely shaking the container or stirring the mass. The product may be used directly as a coating composition. In contrast to the prior art dispersions of superpolyamides which do not dry to form self adherent coatings on metals, for example, the dispersions of the present invention when applied to a substrate such as a metal or glass and dried form self-adherent coatings on the substrate.

As stated hereinabove, a common proposal to form dispersions of high molecular weight polyamides is to dissolve the resin in a solvent and precipitate the resin in a nonsolvent as described in U.S. Pat. No. 2,265,127. The resulting particles are usually of an irregular size and fibrillar in structure. In the partial degradation of high molecular weight polyamides followed by mechanical disintegration, the particles are colloform or globular, granular in shape or structure and random in size. If the initial polymerization step using the higher proportions of water as described in U.S. Pat. No. 2,241,322 is arrested and the mass is allowed to cool, the low molecular weight polyamide resin particles are randomly sized and consist of densely packed, oriented lamellar sheets.

In contrast to these prior products, for example, the low molecular weight polycaprolactam resin particles of this invention, wherein the reaction mass is quenched rapidly and the pH of the quenched mass is controlled, the particles are uniform in size and consist of loosely packed, randomly oriented, bonded lamellar sheets or lamella or clusters of flaky sheets. When examined by the electron microscope, these particles appear much like a mass of wet cornflakes where the flaky sheets drape over each other into loose clusters. It is believed that this flake-like structure aids in a spreading of the flakes over the surface of the substrate in much the same manner as the so-called "metal" paints, that is, paints or coatings containing metal flakes such as aluminum, bronze, etc.

The dispersion as resulting from the quenching of the reaction mass may be used directly as a coating composition providing the quenched mass possesses the desired solids content. If desired, the solids may be separated from the quenched mass in the form of a wet cake as by centrifugation or electrodeposition so as to reduce the monomer and oligomers content and then redispersed in water to form a desired concentration of dispersed solids. Alternatively the wet cake may be washed with water so as to remove additional monomer and oligomers which may be present in the wet cake prior to redispersing the solids in water. The proportion of monomer and oligomers present in the quenched mass will vary inversely with the proportion of monomer (assuming equilibrium conditions are used), or of high molecular weight polyamide in the initial charge. Inasmuch as the monomer becomes volatilized during subsequent heat treatment of the coatings, the monomer content is preferably reduced by one or more of these processing steps particularly when non-equilibrium conditions are used in forming the polyamide. In reference to the production of the polyamide from ε-caprolactam as outlined above, the proportion of monomer and oligomers will vary from about 42% to about 14%, based on the solids content of the quenched mass.

In the production of a dried product, the recovered quenched mass is preferably spray dried and the monomer content will be lowered due to the temperatures employed. If desired, both washing and spray drying may be utilized to effect a reduction in the monomer and oligomers content. An outstanding characteristic of the spray dried products is the ease with which the product may be redispersed in water. A dispersion which remains stable for extended periods of time may be formed by adding the spray dried powder to water and shaking the mass or by subjecting the mass to agitation.

Since in most instances the completed coating desired is a high molecular weight polyamide, a polymerization catalyst is preferably included in the dispersion. Compounds which are or which upon heating are converted to non-volatile, strong acids may be used as catalysts and include such compounds as orthophosphoric acid, monoammonium orthophosphate, diammonium orthophosphate, orthophosphorous acid, metaphosphoric acid, p-toluenesulfonic acid and the ammonium salt of benzyl phosphite. In view of the range of pH of solutions of these catalysts, they may be advantageously incorporated in the initial charge or in the quenching medium to control the pH of the final quenched mass. In general, the proportion of catalyst desired in the final coating composition is between about 0.15% and about 0.8%, preferably 0.3% to 0.6%, based on the weight of the polymer. Where lesser amounts are used in the initial charge or quenching medium so as to obtain a predetermined desired pH, an additional amount of catalyst may be mixed into the dispersion prior to its application to a substrate.

The aqueous dispersion, recovered quenched mass or reconstituted dispersion, is applied to a desired substrate by any conventional method, such as brushing, dipping, spraying, electrostatic spraying, etc. In the subsequent heating step, water is evaporated and heating is continued so as to melt the polyamide flakes, allow the liquid phase to flow and permit molecular polymerization, thereby forming the adherent continuous coating. In the instance where the polymer has been prepared from ε-caprolactam, and the dispersion contains a catalyst, after application of the coating to the substrate and the coating is subjected to the required heat treatment, it has been found that there occurs about a 15-fold to about a 45-fold increase in the weight average molecular weight and the film properties are those of the usual high molecular weight polycaprolactam or nylon-6 film. As an alternative, the dried powder product containing a catalyst may be applied to the substrate by any conventional powder coating technique, such as, for example, fluidized bed coating, flame spraying, electrostatic spraying, etc. As a further alternative, the resin particles may be deposited from an aqueous dispersion on conducting substrates by electrophoretic techniques. The specific temperature utilized in the heat treatment will be dependent upon the specific low molecular weight resin, generally being at the melting point of the resin. The period of heat treatment will vary directly with the thickness of the coating. Again referring to a low molecular weight polycaprolactam as produced as described herein, the coating will be heated to a temperature of about 235° C. for a short period, such as 10 to 15 minutes where the coating thickness is between about 2 and 5 mils.

The examples which follow illustrate the practice of the present invention but are not to be considered as limitations. Where reference is made to percentages of various substances, the percentages are by weight unless stated otherwise. In the case of references to percentages of additive or catalyst, the percentage is based upon the weight of the resin forming monomer or constituents. Stated pressures are pounds per square inch (psi) gauge. Reduced viscosities were determined at 20° C. on m-cresol solutions of the resins containing 1 gm. of resin per deciliter of solution.

EXAMPLES 1-9

In the preparation of the resins of these examples, a 10 gal., electrically heated, stainless steel autoclave was utilized. The autoclave was fitted with a stirrer and a dip tube having a valve externally of the autoclave. The end of the dip tube internally of the autoclave extended to a position just above the bottom of the vessel. The external end of the dip tube was positioned near the bottom of a 30 gal. stainless steel tank which was provided with a Lightnin Mixer. In each example, about 6 gals. of a solution of ε-caprolactam in distilled water, after filtration to remove any possible foreign matter, with or without phosphoric acid, were charged into the autoclave and the autoclave sealed. The stirrer was operated at about 270 RPM. Heat was applied for the stated period of time. In general, 2½ to 3 hours were required to bring the reaction mass to about 235° C. and the mass was maintained at this temperature to the end of the stated periods of time. The autogenous pressure reached about 460 to 500 psi. At the termination of the heating period, heating was discontinued and the dip tube valve opened whereby the autogenous pressure in the autoclave forced the mass through the dip tube into the quench tank. The quench tank contained a mixture of about 160 lbs. of water and about 40 lbs. of crushed ice. Generally, the mass was discharged in about 90 seconds and the temperature of the entire mass reduced to about 50° to 60° C. within this period of time. Specifically, in Example 6, 33.38 lbs. of ε-caprolactam was dissolved in 22.26 lbs. of distilled water. About 3 hours were required to heat the mass to 235° C. and the pressure reached about 470 psi. The total heating period was 8 hours. Heating was then discontinued and the mass discharged in 90 seconds into a bath (temperature about 0° C.) consisting of 167 lbs. of water and 39 lbs. of crushed ice and at the end of the discharge period the temperature of the entire mass was about 51° C.

In this group of examples, the proportions of monomer, ε-caprolactam, and water varied from 30% monomer and 70% water to 80% monomer and 20% water. Samples of the dispersions (adjusted to about 14% to 15% solids) were poured into soft, thin gauge aluminum pans to provide coatings of about 5 mils in thickness. In those examples where no phosphoric acid catalyst had been incorporated in the initial charge, 0.3% phosphoric acid (about 0.35% of 85% phosphoric acid) was added to and mixed into the dispersion before pouring a sample into the aluminum pans. The coatings were then heated to 230° to 240° C. for about 15 minutes. Subsequently the coatings were stripped from the aluminum and the reduced viscosities of the film determined.

Samples of the dispersions were also tested in a thermobalance (Perkin Elmer TGS-1). In this test a sample of known weight was first dried by passing dry helium at room temperature over the sample until no change in weight was noted. The temperature of the sample was then increased at a rate of 10° C. per minute to 80° C. while continuing the flow of helium over the sample. The weight of the sample was noted and the loss in weight from the original sample was considered as the water content of the dispersion. The heating rate was then continued until the sample had been heated to 210° C. and the weight of the sample noted. The loss in weight of the sample between 80° C. and 210° C. was considered an approximation of the monomer and oligomer content of the low molecular weight polymer produced. The properties of the products of this group of examples are tabulated in Table I. The molecular weight of the resins and the films were determined by a combination of the gel permeation chromatography procedure and solution viscosity measurements. Samples of the dispersions were air dried and the melting points of the recovered resins were determined by the use of the Fisher-Johns Melting Point Apparatus.

cakes were then washed by redispersing the solids in water to provide dispersions containing about 14% solids and the dispersions again subjected to centrifugation and the monomer and oligomer content measured. The filter cakes were again redispersed in water to form dispersions containing about 14% solids and 85% phosphoric acid added in an amount sufficient to provide 0.3% phosphoric acid based on the weight of the solids. The dispersions were subsequently spray dried by spraying the dispersions at room temperature into a spray drying chamber, the introduced air having a temperature of about 350° F. (177° C.) and the air leaving the chamber having a temperature of about 210° F. (99° C.). The spray dried powders contained approximately 0.3% phosphoric acid thus exhibiting no loss of phosphoric acid in the spray drying. Samples of the quenched masses, the washed products and the spray dried products were tested in the thermobalance so as to determine the monomer and oligomer content of the products at the various stages. The properties were as reported in the following table:

TABLE II

| | | Reaction period Hours 235° C. | Quenched mass | | | Particle size microns | Oligomer & Monomer Content % based on solids | | | |
|---|---|---|---|---|---|---|---|---|---|---|
| Example | CL/H$_2$O % | | % Solids | Final Temp. ° C. | pH | | Quenched Mass | Centrif. Quenched Mass | Washed & Centrif. | Spray Dried |
| 10 | 50/50 | 10 | 14.1 | 53 | 8.43 | 5–6 | 29.3 | 9.8 | 7.7 | 4.4 |
| 11 | 60/40 | 10 | 14.1 | 51 | 8.22 | 5–6 | 21.2 | 7.4 | 5.3 | 3.2 |
| 12 | 70/30 | 5 | 14.1 | 49 | 8.07 | 5–7 | 19.6 | 4.8 | 2.4 | 1.7 |

CL — ϵ-caprolactam

EXAMPLES 13–35

TABLE I

| Example | % CL | % H$_2$O | Additive %* | Reaction time hours | Reduced viscosity resin | $\overline{M}_w$ (×10$^3$) | $\overline{M}_n$ (×10$^3$) | Resin MP ° C. | Reduced*** viscosity film | $\overline{M}_w$ (×10$^3$) | Wt. loss % |
|---|---|---|---|---|---|---|---|---|---|---|---|
| 1 | 30 | 70 | — | 24 | 0.115 | 2.5 | 1.3 | 115–120 | 0.874 | <60 | 41.5 |
| 2 | 40 | 60 | 0.3 | 24 | 0.128 | 2.8 | 1.5 | 128–132 | 1.16 | 63.1 | 31.9 |
| 3 | 50 | 50 | 0.3 | 8 | 0.160 | 3.0 | 1.6 | 150–153 | 1.20 | 64.6 | 24.2 |
| 4 | 55 | 45 | 0.3 | 10 | 0.177 | 4.5 | 2.4 | 153–155 | 1.32 | 74.1 | 22.2 |
| 5 | 60 | 40 | — | 8 | 0.200 | 5.2 | 2.7 | ** | 1.32 | 74.1 | 22.0 |
| 6 | 60 | 40 | — | 10 | 0.203 | 5.3 | 2.8 | 155–158 | 1.46 | 87.0 | 20.9 |
| 7 | 60 | 40 | — | 24 | 0.199 | ** | ** | ** | ** | ** | ** |
| 8 | 70 | 30 | 0.3 | 10 | 0.231 | 6.5 | 3.4 | 193–196 | 3.53 | 303 | 17.1 |
| 9 | 80 | 20 | 0.3 | 10 | 0.397 | 13.8 | 7.3 | 197–200 | 5.04 | <500 | 13.6 |

CL — ϵ-caprolactam
*"Dash" indicates no additive used
**Not measured
***After addition of 0.3% H$_3$PO$_4$ to Examples 1, 5 and 6.

EXAMPLES 10, 11, 12

In this group of examples, the equipment and general procedure as described above were followed utilizing ϵ-caprolactam as the monomer and water, however, no catalyst was added to either the initial charge or the quench bath. The quantity of the quench bath was adjusted so as to provide a final quenched mass containing approximately 14% solids. These examples illustrate the reduction of monomer and oligomer content of the product by filtration, as by centrifugation, by washing with water and by spray drying. In each instance, the monomer and oligomer content of the quenched mass or product was determined as described above. The quenched mass was then subjected to centrifugation in a Komline-Sanderson general purpose centrifuge, Model CL-10, fitted with a solid bowl attachment. The centrifuge was operated at 1800 RPM to provide a filter cake of about 28% solids. The monomer and oligomer content of the centrifuged mass was determined. The filter This group of examples illustrates the effect of the pH of the quenched mass upon the size and the uniformity of size of the produced polyamide resin particles. The monomer used was ϵ-caprolactam. The equipment and preparatory method used were as described in Examples 1–9. The quantities of the various substances were selected so as to provide quenched masses whose pH values varied over a pH range of between about pH 3 and about pH 9. The heating periods were varied and the maximum temperature was about 235° C., except where noted. The particle sizes of the products were determined by microscopic examination. The reduced viscosities were determined as described above. In those instances where no catalyst was present in the product as produced, 0.3% phosphoric acid (about 0.35% of 85% phosphoric acid) was added to a sample of the product before pouring the sample of the dispersion into an aluminum pan for the preparation of fused films. The properties of the products are tabulated in Table III which follows:

TABLE III

| Example | CL/H₂O % | Additive % & Location** | Reaction time Hours | Quenched Mass % Solids | Quenched Mass Final Temp. °C | Quenched Mass pH | Particle Size (mean) microns | Reduced Viscosity* Resin | Reduced Viscosity* Film |
|---|---|---|---|---|---|---|---|---|---|
| 13 | 60/40 | — | 8 | 12.8 | 54 | 8.58 | 5 | 0.2295 | — |
| 14 | 60/40 | — | 8 | 12.4 | 53 | 8.52 | 5 | 0.2050 | — |
| 15 | 60/40 | — | 8 | 14.2 | 37 | 8.48 | 4 | 0.2004 | 1.3240 |
| 16 | 60/40 | — | 8 | 15.2 | 53 | 8.46 | 6 | 0.2390 | — |
| 17 | 50/50 | — | 10 | 14.1 | 53 | 8.43 | 5 | 0.1876 | — |
| 18 | 65/35 | — | 8–220° | 13.2 | 40 | 8.32 | 3 | 0.2126 | — |
| 19 | 65/35 | — | 8 | 13.3 | 40 | 8.32 | 6 | 0.2557 | — |
| 20 | 60/40 | — | 10 | 14.1 | 51 | 8.22 | 6 | 0.2193 | — |
| 21 | 60/40 | 0.43 (A)C | 24 | 27.0 | 85 | 7.98 | 6 | — | — |
| 22 | 50/50 | 0.3 (B)Q | 10–265° | 11.0 | 54 | 7.12 | 2 | 0.1632 | — |
| 23 | 60/40 | 0.3 (B)Q | 10 | 12.2 | 34 | 6.73 | 1 | 0.1862 | 1.5403 |
| 24 | 40/60 | 0.3 (B)C | 24 | 12.4 | 72 | 6.70 | 2 | 0.1281 | 1.1593 |
| 25 | 50/50 | 0.3 (B)C | 10 | 14.1 | 55 | 6.63 | 1 | 0.1596 | 1.2266 |
| 26 | 70/30 | 0.3 (B)Q | 10 | 14.0 | 36 | 6.61 | 2 | 0.2308 | 3.5315 |
| 27 | 50/50 | 0.3 (B)C | 10 | 18.5 | 76 | 6.57 | 1 | 0.1381 | 1.8160 |
| 28 | 50/50 | 0.3 (B)C | 8 | 12.7 | 53 | 6.53 | 1 | 0.1604 | 2.7475 |
| 29 | 60/40 | 0.55 (B)Q | 24 | 23.8 | 87 | 6.32 | 1 | 0.2305 | — |
| 30 | 60/40 | 0.58 (B)Q | 24 | 23.7 | 80 | 6.30 | 0.5 | 0.2256 | 1.8725 |
| 31 | 60/40 | 7.7 (B)C | 18 | 13.0 | 45 | 4.52 | 1 | 0.1835 | 0.6062 |
| 32 | 60/40 | 7.7 (B)Q | 18 | 13.0 | 45 | 3.58 | 1 | 0.2016 | — |
| 33 | 70/30 | 1 NH₄St.C | 5 | 13.4 | 45 | 8.88 | <1 | 0.2528 | — |
| 34 | 60/40 | 1 NH₄St.C | 24 | 12.7 | 43 | 8.48 | <0.1 | 0.2171 | 1.0812 |
| 35 | 50/50 | (1 NH₄St.C (10(B)Q | 10 | 3.7 | 43 | 3.05 | <0.1 | 0.1576 | — |

CL — ε-caprolactam
A — Diammonium orthophosphate
B — Orthophosphoric acid
C — Charge
Q — Quench bath
NH₄St. — Ammonium stearate
*"Dash" indicates value not measured
**"Dash" indicates no additive used From the foregoing data it will be noted that, in the absence of a soap in the initial charge, the mean size of the resin particles are within the range of between about 2 microns and 6 microns in those instances where the pH value of the quenched mass is within the range of about pH 7 and about pH 9. Where the pH value of the quenched mass is within the range of about pH 3.5 and about pH 7, the mean size of the resin particles are within the range of between about 0.5 micron and about 2 microns. In the presence of a soap in the initial charge the mean size of the particles will be under 1 micron where the pH of the quenched mass is within the range of about pH 3 and about pH 9. In Example 35 where ammonium stearate was included in the initial charge and sufficient orthophosphoric acid was present in the quench bath to form a quenched mass of pH 3.05 the particles were of a size of approximately 0.03 × 0.03 × 0.005 micron. Thus, conditions of preparation may be controlled so as to provide particles of a size adapted for specific uses dictated by the desired thickness of a particular coating.

It will be noted that in Example 31, although the resin particles as formed possessed a low molecular weight as measured by the reduced viscosity, the fused film did not exhibit a typical increase in molecular weight. Failure to attain the high molecular weight was due to the presence of an amount of orthophosphoric acid (7.7%) beyond the useful range for catalyzing a low molecular weight polycaprolactam to the desired high molecular weight.

The application of the present invention to the preparation of other polyamides from other monomers and the preparation of finely-divided particles of copolymers is illustrated by the examples which follow:

EXAMPLE 36 and 36A

Hexamethylenediammonium adipate (nylon 6,6 monomer salt) was prepared as described in Preparative Methods of Polymer Chemistry, 2nd edition, by Wayne R. Sorenson and Tod W. Campbell, page 74. The preparation of low molecular weight resin particles followed the general procedure as described above. In this example, a 2 liter stainless steel laboratory autoclave was fitted with a stirrer and dip tube in a manner as described above. In each instance, a 1080 gram mixture of the monomer salt and water was used. In the first case the mixture contained 60% of the monomer salt, while in the second case the mixture contained 80% of the monomer salt. In each case, after introducing the mixture into the autoclave, the autoclave was sealed and heat was applied for 24 hours. The maximum temperature was 280° C. In the first case, the reaction mass was discharged into an agitated quench bath consisting of 1620 grams of water and 1620 grams of crushed ice while in the second case, 2340 grams of water and 2340 grams of crushed ice were used. Both quenched masses were creamy dispersions, the first containing 11.6% solids and having a pH of 9.4, while the second contained 12.1% solids and had a pH of 9.3. The particles of the first product had a bimodal distribution of sizes with two peaks; that is, one group of particles having a mean size of 2 microns with the other group having sizes between 10 and 60 microns. The mean size of the particles of the second product was about 15 microns.

EXAMPLES 37–40

In this group of examples, copolymers were prepared from mixtures consisting of 85% ε-caprolactam (nylon 6 monomer) with 15% hexamethylenediammonium adipate (nylon 6,6 salt), or 15% amino-undecanoic acid (nylon 11 monomer) or 15% ω-lauryl lactam (nylon 12 monomer). The general preparatory procedures were as described hereinbefore. In Examples 37, 38 and 39, the products were prepared utilizing the 2 liter stainless steel autoclave, while in Example 40, the 10 gal. autoclave was utilized. After introducing a mixture of monomers and water into the autoclave and sealing the autoclave, heat was applied for the stated period. In each example, the maximum temperature was about 235° C. After the heating period, the reaction mass was discharged into an agitated quench bath consisting of water and crushed ice. The properties of the products were as tabulated in Table IV which follows:

TABLE IV

| Example | M/H$_2$O % | CL | M2 | H$_2$O | H$_3$PO$_4$ Quench Bath | Time Hours | Quenched Mass % Solids | pH | Particle Size Microns Mean | Max | Resin MP ° C |
| --- | --- | --- | --- | --- | --- | --- | --- | --- | --- | --- | --- |
| 37 | 50/50 | 342 g | 198 g (N66) | 540 g | none | 24 | 21.7 | 8.58 | 1 | 2 | 95–100 |
| 38 | 60/40 | 551 g | 97 g (N11) | 432 g | 0.6% | 18 | 10 | 5.68 | 0.5 | 1 | 115–120 |
| 39 | 50/50 | 459 g | 81 g (N12) | 540 g | 0.3% | 10 | 12 | 6.48 | 1 | 1 | 105–110 |
| 40 | 50/50 | 23.65 lbs | 4.17 lbs (N12) | 27.82 lbs | 0.3% | 10 | 8.2 | 6.62 | 1 | 1 | 105–110 |

M — Monomer mixture
CL — ε-caprolactam
M2 — Comonomer
N66 — Nylon-6,6 salt
N11 — nylon-11 monomer
N12 — Nylon-12 monomer Finely-divided, water dispersible, low molecular weight polyamide particles as described herein may be produced from high molecular weight (fiber- and film-forming) polyamides, such as scrap or waste fibers, film scrap, etc., as illustrated by the following example:

EXAMPLE 41

The high molecular weight polyamide utilized was a commercial polycaprolactam product marketed as Plaskon 8200 Nylon 6 Molding Pellets, Natural Grade (Allied Chemical Co.). The pellets, as received, were ground in a Wiley Mill to pass a 20 mesh screen (841 microns openings). A charge consisting of 500 gms. of the ground polycaprolactam, 500 gms. of water and 5 gms. of ammonium stearate was introduced into the 2 liter autoclave. After sealing, heat was applied for 35 minutes, the maximum temperature reaching 235° C. The heated mass was discharged into an agitated quench bath consisting of 1400 gms. of water, 1400 gms. of crushed ice and 2.75 gms. of 85% H$_3$PO$_4$. The quenched mass had a temperature of 50° C., a pH of 6.72 and contained 13% solids. The particles had a size of 1 to 3 microns. The reduced viscosity of the original polycaprolactam was 2.6670. The product had a reduced viscosity of 0.2533. A sample of the quenched mass after conversion to a fused film in a manner as described above exhibited a reduced viscosity of 1.5280.

Aqueous dispersions of the finely-divided, water dispersible, low molecular weight, linear polyamide particles, either as the formed quench mass, or after concentration to a desired solids content, or after washing to reduce the monomer and oligomer content and redispersed to a desired concentration, or after redispersing a spray dried product, may be applied to a desired substrate. Obviously, in those applications to substrates, such as, for example, metallic substrates, glass structures, such as, glass fibers, etc., where it is desired to convert the coating to a high molecular weight polyamide, the dispersion should contain a polymerization catalyst as set forth hereinbefore. Where the dispersion is intended for uses not requiring a high molecular weight polyamide as desired in the coating art, a polymerization catalyst may be omitted. For example, where the low molecular weight polyamide is intended as a cross-linking or curing agent for water-dispersible epoxy resin compositions, the polyamide catalyst may be omitted.

It is obvious that the dispersions may contain a variety of additives, such as, for example, coloring materials (dyes, pigments, etc.), thermal stabilizers, antioxidants, ultra-violet light stabilizers and biocides. As is obvious, certain of the additives which are non-reactive with the polyamide or monomer and are not affected by the temperatures involved in the heating step may be incorporated in the initial charge. Where the additive is heat sensitive, it may be added to the quench bath or to the dispersion prior to its application to the substrate.

The application of the coatings to metallic substrates may be illustrated by the examples which follow.

EXAMPLE 42

A portion of the quenched mass of Example 15 was centrifuged and the filter cake dispersed in water to form a dispersion containing approximately 25% solids. Sufficient orthophosphoric acid was mixed into the dispersion to provide 0.3% H$_3$PO$_4$, based on the solids content. The metallic substrates were 3 inches × 6 inches, 24 gauge, cold rolled steel panels with Bonderite 37 treatment. The panels were provided with a 10 mil wet coating of the dispersion by means of a doctor blade. The panels were placed in an oven through which nitrogen was circulated and heated to 230° to 240° C. for 15 minutes. The finished coatings were approximately 2 mils in thickness.

Coated panels were subjected to an impact test both directly (on coating) and indirectly (on reverse side of panel) in a Gardner Heavy Duty Impact Tester, Model IG-1120, having a 4 pound weight terminating in a 5/8 inch ball head, the weight being dropped from a 40 inch height. The coatings withstood the maximum impact; namely, a 160 inch-pound impact, both direct and indirect, without separation from the panels nor was there any evidence of a cracking or crazing of the coatings.

Coated panels were also subjected to a flexibility test by the use of a Gardner Mandrel Set, Model MG 1410, commonly employed in the testing of paint coatings. In this test, the coated panel is bent around a 1/8 inch diameter rod, the uncoated side being in contact with the rod. In this test, the coatings exhibited no separation from the panels and no cracking or crazing of the coatings.

In a third test, known as the "3M Scotch Tape Cross-Hatch Adhesion Test", a grid is scored through the coating to the metal with a knife edge, the grid consisting of 11 × 11 lines, the lines being spaced 1/16 inch. 3M Scotch Tape, approximately 3/4 inch in width, is then applied over the area of the grid and rubbed so as to effect good adhesion over the area of the grid, leaving an unadhered portion of the tape beyond the area of the grid. The unadhered tab is then grasped and the tape is pulled off rapidly. The results of this test are expressed in the number of the 1/16 inch × 1/16 inch areas of the coating which are removed. In such tests of the coated panels, no areas of the coating were removed.

For the production of finish decorative coatings where a plane surface of high smoothness and a high degree of uniformity in thickness is desired, that is, a surface free of minute depressions or surface craters and free of an orange-peel effect and the like, a flow promoter may be included in the dispersion. The flow promotor may be included in the quench bath, or may be added to the dispersion before spray drying, or may be added to a dispersion prior to its application to the substrate. The amount of flow promoter may vary from about 1% to about 8%, preferably 3% to 5%, by weight, based upon the solids content of the dispersion. Flow promoters satisfactory include n-butylurea, nylon 6,6 salt, nylon 6,9 salt, nylon 6,10 salt, intermediate molecular weight, water soluble polyethyleneimines, such as the commercial product marketed as NC-1612 by Dow Chemical Co., and water emulsifiable epoxy resins, such as the commercial modified bisphenol A epichlorohydrin-based epoxy resin marketed as Genepoxy M205 by General Mills Chemicals, Inc.

In the electrophoroetic coating of conducting surfaces, the polyamide particles may be provided with either a positive charge whereby the particles will be deposited on a cathode, or with a negative charge whereby the particles will be deposited on an anode. Thus where the dispersion has an acidic pH, as resulting from the presence of phosphoric acid catalyst, for example, the particles will be deposited on the cathode, whereas, if the dispersion has a basic pH, as resulting from the presence of diammonium phosphate catalyst, the particles will be deposited on the anode. The electrophoretic coating may be illustrated by the following example:

EXAMPLE 43

A portion of the spray dried product of Example 14 was dispersed in water by means of a Waring Blendor to form a 5% solids dispersion. Sufficient orthophosphoric acid was added to provide 0.6% $H_3PO_4$ based on the solids content. A sufficient amount of a 50% water emulsion of GenEpoxy M205 was added to provide 2% of the flow promoter based on the solids content. The pH of the final dispersion was 6.7. The dispersion was then transferred to a stainless steel tank which was subsequently made the anode. The cathode consisted of aluminum alloy (Gardner PG 1304A) panels, 3 inches × 6 inches × 20 mils. The panels were immersed in the dispersion and 50 V.D.C. applied for approximately 10 seconds. The panels were subsequently placed in an oven through which nitrogen was circulated and heated to 230° to 240° C. for 10 minutes. The coating thus formed had a thickness of approximately 1 mil. The continuity of the coatings was tested by the use of a 2.2% hydrochloric acid solution containing about 1% copper sulfate, a copper deposit being indicative of a "pin hole" in the coating. Areas of the coating were covered with drops of the acidic solution and observations were made by the use of a microscope covering a period of 10 minutes. No copper deposits were observed, thus indicating the coatings to be free of "pin holes."

The electrostatic powder spraying of the low molecular weight polyamide product is illustrated by the following example:

EXAMPLE 44

Example 16 was repeated to provide a dispersion of the low molecular weight polycaprolactam particles. Sufficient 85% orthophosphoric acid was added to the quenched mass so as to provide 0.6% $H_3PO_4$, by weight, based on the weight of the polycaprolactam. A sufficient amount of a 50% water emulsion of GenEpoxy M205 was added to provide approximately 3%, by weight, based on the polycaprolactam, of the flow promoter. The mixture was blended for about 15 minutes by use of a Lightnin Mixer. The resulting aqueous dispersion was spray dried by spraying the dispersion at room temperature into a spray drying chamber, the introduced air having a temperature of about 350° F. (177° C.) and the air leaving the chamber having a temperature of about 210° F. (99° C.) The spray dried product recovered was free flowing and had a mean particle size of approximately 20 microns.

The metallic substrates were as described in Example 42. Conventional electrostatic powder spraying apparatus was used wherein the steel panels were grounded. The spray dried powder was blown through the spray gun where the particles were given a high-voltage low-amperage negative charge as they left the spray gun and thus were attracted to and deposited on the grounded panels. The coated panels were subsequently heated in an air oven to about 205° C. for 10 minutes. The resulting coating was approximately 2 mils in thickness. The coatings were subjected to the "3M Scotch Tape Cross-Hatch Adhesion Test" as described in Example 42. In such tests, no areas of the coating were removed.

In the foregoing example reference is made to the use of a spray dried, free flowing powder having a mean particle size of about 20 microns. The unique characteristic of the spray dried products is that when such a product is added to an aqueous medium and the mixture is subjected to agitation as by use of a Lightnin Mixer or Cowles Dissolver, the product reverts to the approximate particle size of the material before spray drying and the resulting dispersion is almost indistinguishable from the dispersion from which the dry powder was derived.

Glass fibers and filaments have a harsh hand or feel and poor resistance to abrasion when rubbed together and necessitate specialized handling to convert them into textile products. Because of the non-hydrophilic nature of glass, the conventional yarn finishes have not been satisfactory. The coatings formed from dispersions of the low molecular weight polyamides of the present invention overcome these inherent disadvantageous characteristics. In the production of glass filaments, they may be passed over or between rolls so as to apply a dispersion by roller coating. The thickness of the coating may be controlled by the solids content of the dispersion and by the particle size of the dispersed polyamide particles. The filaments are then passed through a suitable heating zone so as to fuse the coating. The coating is flexible, tough and is resistant to abrasion and permits the use of yarn finishes as conventionally utilized in the nylon textile industry.

Furthermore, as indicated hereinbefore, the polyamide dispersion may contain coloring materials such as pigments or dyes so as to provide glass based filaments of any desired color. Alternatively, the coated filaments or textile products formed from such filaments may be dyed to a desired color.

Although in some of the preceding examples and in the foregoing discussion the dispersions of the polyamide particles have been applied directly to a substrate, in certain instances it may be desired to apply to a substrate a different coating or polymer which may not have a sufficiently high toughness and/or abrasion resistance. In such instances, the use of the present dispersions may be advantageously used to form an overcoat of high toughness and abrasion resistance. For example, in the wire coating art, in many instances, the wire may first be provided with an enamel coat such as a polyester coat deposited from a solution of the polyester. The dispersions of the present invention may be applied over the base coat and cured as described above to provide an outer coating of greater toughness necessary for subsequent winding operations.

In the illustrative examples, the coatings after application to a substrate were heated to temperatures between about 205° C. and 240° C. The specific temperature used to melt the low molecular weight polyamide particles and permit the molten material to flow and to polymerize the polymer to a desired high molecular weight must be, obviously, at least the melting point of the specific low molecular weight polyamide. Higher temperatures may be used so as to reduce the required polymerization period that the temperature is not sufficiently high to adversely affect the polymer, as by decomposition.

In the foregoing discussion, reference has been made to "superpolyamides" and "fiber- and film-forming polyamides" and these terms have been used in the sense first enunciated by Carothers. The simple test usually used to define fiber-forming polymers has involved dipping an end of a rod into the molten polymer and withdrawing the rod so as to determine whether or not a self-supporting filament could be drawn from the molten polymer. As indicated by Carothers, fiber-forming polymers (superpolymers) generally require a molecular weight of at least 10,000 for minimum fiber properties. The term "super-polymer" was coined by Carothers to describe polymers having molecular weights above 10,000 (Textbook of Polymer Science, 2nd Ed., 1971, by Fred W. Billmeyer, Jr.). For practical fiber-forming purposes the molecular weight should substantially exceed 10,000. For example, in Encyclopedia of Polymer Science and Technology, 1st Edition, in the section entitled Polyamides by W. Sweeny and J. Zimmerman (page 542), it is pointed out that commercial nylon fiber has a number average molecular weight of from about 12,000 to 15,000.

The term "low molecular weight polyamide" as used herein and in the claims is intended to designate polyamides having a number average molecular weight of from about 1,300 to not exceeding about 7,300. The polyamide products of the present invention preferably have a reduced viscosity within the range of from about 0.15 to about 0.26. As is apparent from the foregoing discussion the molecular weight or reduced viscosity may be controlled by the relative weight proportions of the polyamide forming constituent and the water. The specific particle size and uniformity of particle sizes in a specific product is controlled by an instantaneous quenching of the heated reaction mass and the pH of the quenched mass.

It is obvious that the examples illustrate the preparation of the products by batch procedures. Conveniently, in such preparations the instantaneous cooling of the reaction mass is effected by discharging the reaction mass into an agitated quench bath. It is obvious that other means may be utilized, particularly in a continuous method. For example, the quenching medium may be pumped through a conduit positioned so that the quenching medium impinges on or collides with the reaction mass as it is discharged from the dip tube and the resulting quenched mass then collected in a suitable vessel. Alternatively, the dip tube may discharge the reaction mass and the quenching medium may be simultaneously pumped into a mixing chamber from which the quenched mass may be withdrawn continuously. In the latter procedures, any desired additive, such as catalysts, flow promoters, stabilizers, pigments, etc., may be conveniently metered into the conduit through which the quenching medium passes so as to aid in providing an intimate mixture or blend of these agents throughout the quenched mass.

As stated hereinabove, one of the unique characteristics of the water-dispersed polyamide particles is the very narrow size distribution of the particles. In general, the size distribution of the particles of any specific product will vary directly with the mean particle size; that is, the lower the mean particle size, the narrower the size distribution. The particle size distribution is about $d \pm 0.8d$, where $d$ is the mean particle size; in other words, the sizes of the particles in any specific product will be within a range of between about $d - 0.8d$ and about $d + 0.8d$. Thus in Example 35 where soap was present in the initial charge and the quenched mass had a pH of about 3, the mean particle size was approximately $0.03 \times 0.03 \times 0.005$ micron and the particles ranged in the larger dimension from about 0.006 micron to about 0.054 micron.

Upon spray drying of a dispersion of the polyamide resin particles, the particles become bound together loosely into agglomerates and form a free flowing powdery product. The size of the dry, free flowing powder particles may be within a range of between about 3 microns and about 150 microns, the mean particle size of any specific product being dictated by the intended use. The unique characteristic of these loosely bound agglomerates is that when subjected to agitation in water, the agglomerates readily disintegrated or crumble into what appears to be the same particles as were present in the original dispersion prior to spray drying. For example, when the dispersions of Examples 14, 18 and 19 were spray dried, the dried products were free flowing and consisted of agglomerates of sizes within the range of 3 microns to about 35 microns. Upon agitation in water by the use of a Cowles Dissolver, the agglomerates had broken up into dispersed particles having mean sizes of about 5-6 microns, 3-6 microns and 5-6 microns, respectively. Where the powder product is intended for use in electrostatic and flame spraying techniques, the mean particle sizes are preferably in the lower portion of the range, for example, between 20 microns and 40 microns. Where the product is intended for fluidized bed techniques, coarser particles are preferred such as products having mean particle sizes between about 75 microns and 150 microns.

The particles as formed from $\epsilon$-caprolactam and copolymers predominating in $\epsilon$-caprolactam are loosely packed, randomly oriented, bonded lamellar sheets, or clusters of flaky sheets which are plate-like in structure with two dimensions roughly equal and having irregular or crenulated edges. In the case of the particles produced from the nylon-6,6 monomer salt (Example 36), the ultimate particles are similarly lamellar sheets but are more bladed-to-fibrous in structure.

In the foregoing description and discussion, references have been made to particle sizes. In Example 35, the particles are ultimate particles and consist of flaky sheets or lamella, the particle size (d) designating the maximum dimension of the lamella. The particles, for example, as formed in Examples 13 - 32, consist of loosely packed clusters of flaky sheets and the particle size (d) designates the maximum dimension or approximate diameter of the clusters. The spray dried products consist of loose agglomerates of the clusters of flaky sheets and, as stated above, readily separate into the original clusters of flaky sheets when subjected to agitation in water. The particle size of the spray dried products has reference to the maximum dimension or diameter of the agglomerates of the clusters. Aggregates designate materials which consist of tightly bonded particles which do not separate into the original particles when subjected to agitation in water.

In the production of spray dried products, the dispersion which is to be sprayed dried should not contain ultimate particles such as produced when soap is included in the initial charge. The presence of such submicron particles results in the formation of aggregates wherein the particles are tightly bound and upon agitation in water the aggregates do not disintegrate into the original particles. It is essential that the dispersion to be spray dried contains particles consisting of loosely packed, randomly oriented, clusters of flaky sheets so that the dried product consists of loosely bound agglomerates which disintegrate readily upon agitation in water to form the particles as were present in the dispersion prior to spray drying.

However, if desired, spray dried products may be prepared from the soap containing dispersions (Examples 33 - 35) or from dispersions containing sub-micron particles. Such spray dried products will consist of aggregates that are capable of withstanding abrasion such as occurs in fluidized bed coating techniques. In such techniques where the coating powders are in a continuing swirling motion, the aggregates because they contain the original particles tightly bonded together do not crumble or break apart into minute particles which will escape or be blown from the fluidized bed chamber. The aggregates, however, will deposit on the heated substrate, melt and flow and the polyamide may be polymerized as described above.

What is claimed is:

1. In a method of providing a substrate with a self-adherent coating of a high molecular weight, linear polyamide wherein
    (1) the substrate is coated with a dispersion comprising water, finely-divided, water dispersible, low molecular weight, linear polyamide resin particles, between about 0.15% and about 0.8%, based upon the weight of the resin, of a catalyst consisting of a non-volatile, strong acid or a compound which upon heating is converted to a non-volatile, strong acid and between about 1% and 8%, based upon the weight of the resin, of a flow promoter,
    (2) the coated substrate is heated to at least the melting temperature of the polyamide resin and
    (3) the heated substrate is maintained at the temperature for a period sufficient to cause the polyamide resin to flow and to polymerize the resin to a predetermined high molecular weight,
the improvement which comprises employing as the dispersed polyamide resin particles, finely-divided, water dispersible, low molecular weight, linear polyamide resin particles consisting of loosely packed, randomly oriented, clusters of flaky sheets, the mean particle size of the dispersed particles being between about 0.03 micron and about 6 microns and the particle size distribution being about $d + 0.8\ d$, where $d$ is the mean particle size.

2. The method as defined in claim 1 wherein the low molecular weight polyamide resin has a reduced viscosity betwween about 0.15 and about 0.26 and the coated substrate is heated to a temperature between 205° C. and 240° C. for from 5 minutes to 15 minutes.

3. The method as defined in claim 2 wherein the substrate is a metal.

4. The method as defined in claim 2 wherein the substrate is glass.

5. In a method of providing a substrate with a self-adherent coating of a high molecular weight, linear polyamide wherein
    (1) there is provided a fluidized bed of powder consisting essentially of low molecular weight, linear polyamide resin particles, between about 0.15% and about 0.8%, based upon the weight of the polyamide resin, of a catalyst consisting of a non-volatile, strong acid or a compound which upon heating is converted to a non-volatile, strong acid and between about 1% and 8%, based upon the weight of the polyamide resin, of a flow promoter,
    (2) a heated substrate at a temperature of at least the melting temperature of the polyamide resin is immersed into the fluidized bed and
    (3) the heated substrate is maintained at the temperature for a period sufficient to cause the resin in contact with the substrate to flow and to polymerize to a predetermined high molecular weight,
the improvement comprises employing as the low molecular weight, linear polyamide resin particles, particles consisting essentially of loosely bound agglomerates of loosely packed, randomly oriented clusters of flaky sheets.

6. The method as defined in claim 5 wherein the low molecular weight polyamide resin has a reduced viscosity between about 0.15 and about 0.26 and the substrate is heated to a temperature between 205° C. and 240° C. for from 5 minutes to 15 minutes.

7. The method as defined in claim 6 wherein the substrate is a metal.

8. The method as defined in claim 6 wherein the substrate is glass.

* * * * *

UNITED STATES PATENT AND TRADEMARK OFFICE
CERTIFICATE OF CORRECTION

PATENT NO. : 4,075,369
DATED : Feb. 21, 1978
INVENTOR(S) : Charles F. Ferraro, Richard A. Javick, James A. Robertson It is certified that error appears in the above-identified patent and that said Letters Patent are hereby corrected as shown below:

Column 17, line 30, "period that" should read --period provided that--; Column 20, line 17, Claim 1, "d+0.8d" should read --d$\pm$0.8d-- ; line 21, Claim 2, "betwween" should read --between--; line 47, Claim 5, "improvement comprises" should read --improvement which comprises--.

Signed and Sealed this

Twentieth Day of June 1978

[SEAL]

Attest:

RUTH C. MASON
Attesting Officer

DONALD W. BANNER
Commissioner of Patents and Trademarks